(12) United States Patent
Divisi

(10) Patent No.: US 7,819,236 B2
(45) Date of Patent: Oct. 26, 2010

(54) CONVEYOR AND LUBRICATION PROCESS FOR A CONVEYOR BELT OF A CONVEYOR FOR BOTTLES OR CONTAINERS IN GENERAL

(75) Inventor: Walter Divisi, Egham (GB)

(73) Assignees: Sunbird Investments Limited, St. Helier-Jersey (GB); Dropsa S.p.A., Milan (IT)

(*) Notice: Subject to any disclaimer, the term of this patent is extended or adjusted under 35 U.S.C. 154(b) by 677 days.

(21) Appl. No.: 11/594,368

(22) Filed: Nov. 7, 2006

(65) Prior Publication Data

US 2007/0119685 A1    May 31, 2007

(30) Foreign Application Priority Data

Nov. 25, 2005    (IT)    .............................. MI05A2260

(51) Int. Cl.
  B65G 45/00    (2006.01)
  B65G 45/08    (2006.01)
  F16N 29/00    (2006.01)
(52) U.S. Cl. ........................ 198/493; 198/500; 198/495; 184/18; 184/20
(58) Field of Classification Search ................. 198/500; 184/18, 20
  See application file for complete search history.

(56) References Cited

U.S. PATENT DOCUMENTS

| | | | | |
|---|---|---|---|---|
| 4,619,345 A | * | 10/1986 | Rands | 184/109 |
| 4,877,111 A | * | 10/1989 | Kilper | 184/15.1 |
| 6,247,555 B1 | * | 6/2001 | Millard | 184/15.1 |
| 6,427,826 B1 | * | 8/2002 | Li et al. | 198/500 |
| 6,591,970 B2 | * | 7/2003 | Olson et al. | 198/500 |

FOREIGN PATENT DOCUMENTS

| | | |
|---|---|---|
| EP | 0 976 668 | 2/2000 |
| WO | 00/01979 | 1/2000 |

\* cited by examiner

*Primary Examiner*—Gene Crawford
*Assistant Examiner*—Kavel P Singh
(74) *Attorney, Agent, or Firm*—Ladas & Parry, LLP

(57) ABSTRACT

The conveyor for bottles or containers in general comprises a conveyor belt for supporting the bottles, and a lubricant dispensing unit associated with the conveyor belt. The lubricant dispensing unit comprises a cylindrical element rotatably connected to the conveyor belt and associated with a lubricant feed member, such that the feed member transfers lubricant to the cylindrical element and this, by rotating in contact with the conveyor belt, releases the lubricant onto the conveyor belt. The lubrication process for a conveyor belt of a conveyor for bottles or containers in general consists of feeding lubricant onto a cylindrical element and rotating the cylindrical element in contact with the conveyor belt, such that the lubricant passes onto the conveyor belt.

18 Claims, 2 Drawing Sheets

CONVEYOR AND LUBRICATION PROCESS FOR A CONVEYOR BELT OF A CONVEYOR FOR BOTTLES OR CONTAINERS IN GENERAL

FIELD OF THE INVENTION

The present invention relates to a conveyor and to a lubrication process for a conveyor belt of a conveyor for bottles or containers in general.

BACKGROUND OF THE INVENTION

When conveying bottles or containers presenting similar characteristics, it is known to usually use conveyors comprising conveyor belts on which the bottles are deposited.

DISCUSSION OF THE RELATED ART

The conveyor belts are provided at their end with collection units which channel the bottles towards subsequent treatments (for example to feed them to a labelling machine).

In particular, the collection units comprise a pair of crosspieces against which the bottles collide and by which they are guided.

The crosspieces define a passage port enabling only one bottle to pass at a time; hence in practice the bottles arrive continuously to accumulate at the crosspieces, whereas only one bottle at a time can pass through the port and be channelled to the next operation.

Consequently, as the bottles remain accumulated at the crosspieces and as the conveyor belt continues to translate continuously without stopping, the bottles have necessarily to slide on the conveyor belt.

To facilitate sliding and to prevent the bottles from falling over because of friction, it is known to lubricate the conveyor belt upper surface (that on which the bottles are placed).

According to one embodiment, lubrication is effected with soapy water; however the use of soapy water requires enormous water volumes which have to be prepared (by mixing the water with the soap), then dispensed in the correct quantities onto the conveyor belt, and then disposed of or recycled.

However, the constructional complications (in particular related to the enormous water quantities to be handled) involved in using water means that currently its use has been abandoned and has been replaced by the use of (synthetic) lubricating oil to effect minimal lubrication of the conveyor belts.

Conveyor belt lubrication (minimal) by lubricant is effected by positioning upstream of each conveyor a lubricant feeder provided with brushes in contact with (i.e. which brush) the conveyor belt surface.

A predetermined lubricant amount is fed to the lubricant feeder, to be released by the brushes onto the conveyor belt.

The importance of correctly lubricating the conveyor belt is evident, because if lubrication is excessive, the bottles slide on the conveyor belt and are unable to overcome even small inclinations, whereas if lubrication is insufficient, the bottles overturn (on being braked and accumulated at the crosspieces).

In addition, the great precision and accuracy required in lubricating the conveyor belt means that the feeder must comprise a gear pump feeding a plurality of dosing elements, each connected to a brush (each brush is 500-800 mm in width, hence each conveyor belt is usually provided with numerous brushes).

Moreover the brushes, which operate in contact with the conveyor belt to release the lubricant, inevitably collect the dirt which accumulates on the conveyor belt and tend to be consumed because of wear due to the relative slipping movement between the conveyor belt and the brushes.

SUMMARY OF THE INVENTION

The technical aim of the present invention is therefore to provide a conveyor and a process for lubricating a conveyor belt of a conveyor for bottles or containers in general which enable the stated drawbacks of the known art to be eliminated.

Within the framework of this technical aim an object of the invention is to provide a conveyor and a process which enable a correct amount of lubricant to be dispensed onto the conveyor belt to enable the bottles to slide only at the crosspieces (i.e. when the bottles are halted by the crosspieces).

Another object of the invention is to provide a conveyor and a process which are able to effect (minimal) lubrication of the conveyor belt with very precise lubricant quantities and to distribute the lubricant with considerable uniformity over the entire surface of the conveyor belt.

A further object of the invention is to provide a conveyor which is structurally simple and does not require a large number of dosing elements for correct operation.

A further object of the invention is to provide a conveyor and a process which are reliable and present limited wear of the parts in relative movement (in particular the lubricant feed part in contact with the conveyor belt).

The technical aim, together with these and other objects, are attained according to the present invention by a conveyor and a process for lubricating a conveyor belt of a conveyor for bottles or containers in general, in accordance with the accompanying claims.

BRIEF DESCRIPTION OF THE DRAWINGS

Further characteristics and advantages of the invention will be more apparent from the ensuing description of a preferred but non-exclusive embodiment of the conveyor and the process according to the invention, illustrated by way of non-limiting example in the accompanying drawings, in which.

DETAILED DESCRIPTION OF THE INVENTION

Figure 1:
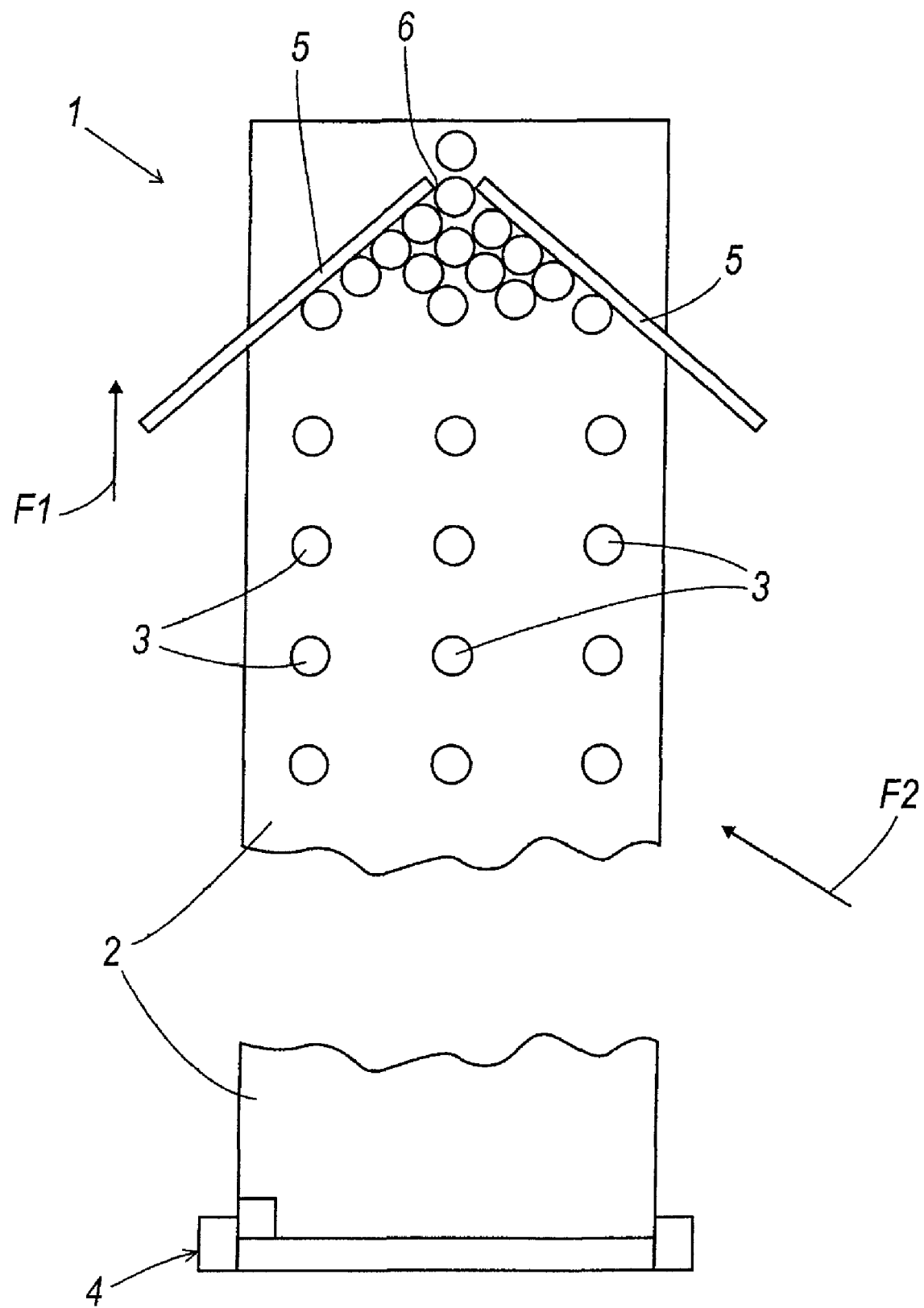
FIG. 1 is a schematic view of a conveyor according to the invention seen from above.

With reference to said figures, these show a conveyor indicated overall by the reference numeral 1.

The conveyor 1 comprises a conveyor belt 2 for supporting the bottles or containers 3, and a lubricant dispensing unit 4 associated with the conveyor belt 2; the lubricant consists of lubricating oil and enables minimal lubrication of the conveyor belt to be effected.

As shown in FIG. 1, the conveyor is also provided with a collection unit for the bottles 3 which comprises two crosspieces 5 disposed above the conveyor belt (but spaced therefrom) and disposed inclined such that their closest portions mutually converge but are spaced apart to define a space 6 through which a single bottle can pass at a time.

The lubricant dispensing unit 4 comprises a cylindrical element 8 rotatably connected to the conveyor belt 2 and associated with a lubricant feed member 9.

In this manner the feed member 9 transfers lubricant to the cylindrical element 8 and this, by rotating in contact with the conveyor belt 2, releases the lubricant onto the conveyor belt 2.

The cylindrical element 8 is associated with the conveyor belt 2 along a generating line 11 thereof.

In particular, the cylindrical element 8 is made of an impregnable material such Teflon® or felt.

The feed member 9 comprises a fixed tubular element 12 provided with a plurality of through holes 13, and on which the cylindrical element 8 is slidably mounted.

The through holes 13 are preferably disposed facing upwards so that when the device is not operating the lubricant contained in the fixed tubular element 12 cannot escape from the holes 13.

The feed member 9 comprises a lubricant dosing head 14 for inserting lubricant into the fixed tubular element 12.

The feed member 9 also comprises a movable tubular member 15 slidably inserted into the fixed tubular member 12 and rigid with the cylindrical element 8; it is such as to allow the lubricant to pass from the inside to the outside of the fixed element 12, to be distributed onto the cylindrical element 8.

The movable tubular member 15 presents a plurality of radial through holes 17 alignable with the through holes 13 of the fixed tubular member 12, to enable the lubricant to pass from the inside of the movable tubular member towards the cylindrical element.

Figure 2:
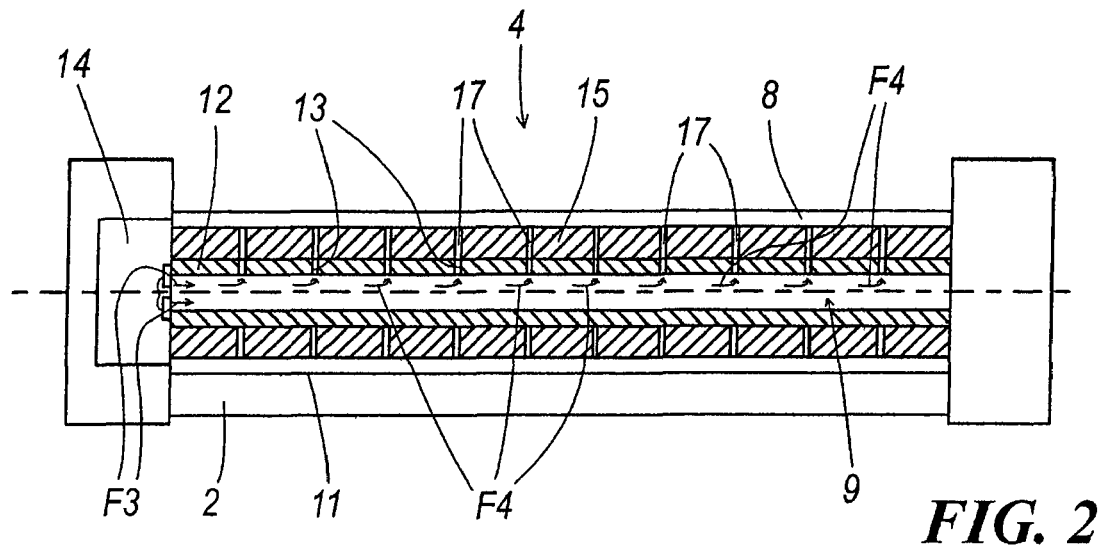
FIG. 2 is a longitudinal section thorough a lubricant dispensing unit of the conveyor of FIG. 1.
Figure 3:
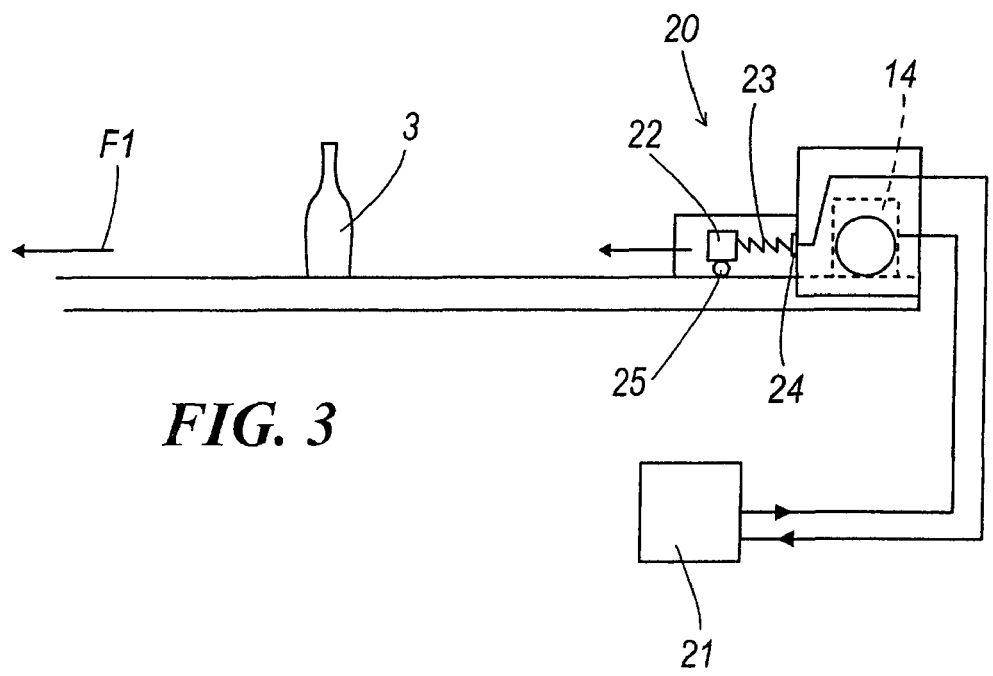
FIG. 3 is a device for measuring the friction coefficient of the device of FIG. 1.

The through holes 17 are provided over the entire surface of the movable tubular member 15 (for example FIG. 2 shows two rows of through holes 17 disposed at 180° apart, however any number of such rows of through holes 17 can be provided, for example eight rows of through holes can be provided, spaced 45° apart).

Preferably, the movable tubular member 15 is idly slidable on the fixed tubular member 12 and is made of a plastic material such as nylon.

Advantageously, The conveyor 1 also comprises a device 20 for measuring a quantity indicative of the friction coefficient between the conveyor belt 2 and the bottles 3 or containers.

The conveyor also comprises control means 21 (consisting for example of an electronic processor or a PLC) to receive a signal from the measuring device 20 and control the lubricant dosing head 14 in relation to the received signal, in order to maintain the measured quantity within a predetermined range.

Specifically, the measuring device 20 comprises a slider 22 connected via elastic means 23 (such as a spiral spring) to a sensor 24 able to measure the force acting on it.

The measuring device 20 is also provided with a portion 25 slidably associated with the conveyor belt 2 (and consisting for example of a wheel or roller), such that during operation the slider 22 (which supports the portion 25) is dragged by the conveyor belt 2 and is retained by the elastic means 23 which exert a force on the sensor 24 generating a signal measurable by the PLC 21. In this manner the signal received by the PLC 21 enables the quantity indicative of the friction coefficient to be measured.

The operation of the conveyor according to the invention is apparent from that described and illustrated, and is essentially the following.

The conveyor belt 2 moves as indicated by the arrow F1 and conveys the bottles 3 towards the crosspieces 5; these bottles 3 are continuously fed onto the conveyor belt 2 by a conveyor of known type identified generically by the arrow F2.

While translating, the conveyor belt 2 rotates the cylindrical element 8 and the movable tubular member 15 (these being mutually rigid and are idly slidable on the fixed tubular member 12).

Simultaneously, the lubricant dosing head 14 feeds lubricant into the fixed tubular member 12 as indicated by the arrow F3 of FIG. 2.

The lubricant entering the fixed tubular member 12 causes further lubricant to leave the fixed tubular member 12 through the holes 13, as indicated by the arrows F4 of FIG. 2 (as the fixed tubular member 12 is maintained filled with lubricant).

The lubricant which passes through the holes 13 also passes through the holes 17 of each row when the holes of said row come into alignment with the holes 13.

The lubricant passing through all the holes 17 in succession then impregnates the cylindrical element 8 over its entire surface.

The lubricant dosing head 14 is controlled by the PLC to dispense the lubricant amount in accordance with the commands which arrive from the PLC.

In this respect, the conveyor belt 2 drags the slider 22 which, by way of the spring 23, exerts a force on the sensor 24.

The sensor 24 feeds to the PLC a signal indicative of the friction coefficient between the portion 25 and the conveyor belt 2.

The relative movement between the conveyor belt 2 and the portion 25 is controlled by the lubricant dispensed by the lubricant dispensing unit 4 and is mostly dependent on the characteristics of the lubricant film which covers the conveyor belt 2; consequently, the quantity measured by the sensor 24 is also indicative of the friction coefficient existing between the conveyor belt 2 and the bottles 3 or containers.

The PLC compares the quantity measured by the sensor 24 with values contained in the memory and feeds to the dosing head 14 of the dispensing unit 4 a control signal resulting in the feed of a lubricant amount sufficient to always maintain the value of the measured quantity within a predetermined range.

The present invention also relates to a process for lubricating a conveyor belt of a conveyor for bottles or containers in general.

The process consists of feeding lubricant onto a cylindrical element 8 and rotating the cylindrical element 8 in contact with the conveyor belt 2, such that the lubricant passes onto the conveyor belt, to generate a covering lubricating film thereon.

Preferably, the cylindrical element 8 is impregnated with lubricant.

It has been found in practice that the conveyor and the lubrication process for a conveyor belt of a conveyor for bottles or containers in general according to the invention are particularly advantageous because they enable the lubricant to be dispensed with high precision and uniformity.

Moreover the conveyors of the invention have proved very reliable and economical.

The conveyor and the lubrication process for a conveyor belt of a conveyor for bottles or containers in general conceived in this manner are susceptible to numerous modifications and variants, all falling within the scope of the inventive concept; moreover all details can be replaced by technically equivalent elements.

In practice the materials used, and the dimensions, can be chosen at will according to requirements and to the state of the art.

What I claim is:

1. A conveyor for bottles or containers in general, comprising a conveyor belt for supporting said bottles, and a lubricant dispensing unit associated with said conveyor belt, wherein said lubricant dispensing unit comprises a cylindrical element rotatably connected to said conveyor belt and associated with a lubricant feed member, such that the feed member transfers lubricant to the cylindrical element and this, by rotating in contact with said conveyor belt, releases the lubricant onto the conveyor belt, said conveyor further comprising a measuring device including a slider connected via an elastic connector to a sensor for measuring force and provided with a portion slidably associated with said conveyor belt such that, during operation, said slider is dragged by said conveyor belt and is retained by said elastic connector which, by exerting a force on the sensor, enables a quantity indicative of a friction coefficient to be measured.

2. A conveyor as claimed in claim 1, wherein said cylindrical element is associated with said conveyor belt along a generating line thereof.

3. A conveyor as claimed in claim 1, wherein said cylindrical element is made of impregnable material.

4. A conveyor as claimed in claim 3, wherein said impregnable material of said cylindrical element is Teflon® or felt.

5. A conveyor as claimed in claim 1, wherein said feed member comprises a fixed tubular member, provided with a plurality of through holes, and on which said cylindrical element is slidable mounted.

6. A conveyor as claimed in claim 5, wherein said through holes are directed upwards.

7. A conveyor as claimed in claim 5, comprising a lubricant dosing head for inserting the lubricant into said fixed tubular member.

8. A conveyor as claimed in claim 5, wherein said feed member comprises a movable tubular member slidably mounted on said fixed tubular member and rigid with said cylindrical element, said movable tubular member being arranged to enable the lubricant to pass from the interior of the movable tubular member towards said cylindrical element.

9. A conveyor as claimed in claim 1, wherein said movable tubular member presents a plurality of through holes alignable with the through holes of said fixed tubular member, to enable the lubricant to pass from the interior of the movable tubular member towards said cylindrical element.

10. A conveyor as claimed in claim 1, wherein said movable tubular member is idly slidable on said fixed tubular member.

11. A conveyor as claimed in claim 1, wherein said movable tubular member is made of plastic material.

12. A conveyor as claimed in claim 1, wherein said plastic material of said movable tubular member is nylon.

13. A conveyor as claimed in claim 1, wherein said measuring device is a device for measuring a quantity indicative of the friction coefficient between said conveyor belt and said bottles.

14. A conveyor as claimed in claim 1, comprising a control unit for receiving a signal from said measuring device and for controlling said lubricant dosing head in relation to the received signal, to maintain the measured quantity within a predetermined range.

15. A conveyor comprising:
a conveyor belt configured to move an object when said object is disposed on said conveyor belt;
a lubricant dispensing unit associated with, and configured to release lubricant onto, said conveyor belt; and
a measuring device associated with said conveyor belt and configured to measure a quantity indicative of a friction coefficient between said conveyor belt and said object, said measuring device comprising:
a slider;
a sensor; and
a connector coupled between said slider and said sensor.

16. The conveyor of claim 15, wherein said slider is configured to be dragged by said conveyor belt and retained by said connector.

17. The conveyor of claim 15, wherein said sensor is configured to measure a force and is provided with a portion slidably associated with said conveyor belt.

18. The conveyor of claim 15, wherein said connector is an elastic or spring connector.

* * * * *